(12) United States Patent
Ragnoni et al.

(10) Patent No.: US 10,931,457 B2
(45) Date of Patent: Feb. 23, 2021

(54) SYSTEMS AND METHODS FOR BLOCKCHAIN-BASED DIGITAL LOTTERY TICKET GENERATION AND DISTRIBUTION

(71) Applicant: IGT GLOBAL SOLUTIONS CORPORATION, Providence, RI (US)

(72) Inventors: Gianluca Ragnoni, Rome (IT); Fabrizio Battini, Rome (IT); Emanuele Martire, Rome (IT)

(73) Assignee: IGT Global Solutions Corporation, Providence, RI (US)

( * ) Notice: Subject to any disclaimer, the term of this patent is extended or adjusted under 35 U.S.C. 154(b) by 371 days.

(21) Appl. No.: 15/916,620

(22) Filed: Mar. 9, 2018

(65) Prior Publication Data

US 2019/0280875 A1    Sep. 12, 2019

(51) Int. Cl.
*H04L 9/06*    (2006.01)
*H04L 9/32*    (2006.01)
(Continued)

(52) U.S. Cl.
CPC .......... *H04L 9/3247* (2013.01); *G07F 17/329* (2013.01); *H04L 9/0637* (2013.01);
(Continued)

(58) Field of Classification Search
CPC ..... H04L 9/3247; H04L 9/321; H04L 9/0643; H04L 9/0637; H04L 63/12; H04L 9/0825;
(Continued)

(56) References Cited

U.S. PATENT DOCUMENTS 6,685,562 B1    2/2004  Rantanen
2018/0096752 A1*  4/2018  Ovalle ................ G07F 17/3241
(Continued)

FOREIGN PATENT DOCUMENTS

| CN | 105913174 A | 8/2016 |
|---|---|---|
| CN | 106504174 A | 3/2017 |
| KR | 101928087 B | 2/2019 |

OTHER PUBLICATIONS

Search Report of the Intellectual Property Office, GB1903234.1, dated Aug. 30, 2019, 8 pages.

*Primary Examiner* — Khoi V Le
(74) *Attorney, Agent, or Firm* — Sage Patent Group

(57) ABSTRACT

A method of generating a digital lottery ticket includes receiving a transaction record associated with a ticket issuance request from a computing device, wherein the transaction record includes transaction data including a player entry and a first public key associated with the player entry, generating a first message including digital ticket information, TKD, relating to the player entry, a source field and a destination field, generating a digital signature of the first message using a private key of an issuer server, transmitting the first message and the digital signature to a transaction certification authority (TCA) server for storage on a publicly viewable transaction ledger maintained by the TCA, receiving from the TCA server a second message including a digital ticket number and a transaction ID associated with the first message and the digital ticket number, and transmitting a third message including the transaction ID and the digital ticket number to the computing device.

18 Claims, 9 Drawing Sheets

(51) Int. Cl.
*G07F 17/32* (2006.01)
*H04L 29/06* (2006.01)
*H04L 9/08* (2006.01)
H04L 29/08 (2006.01)

(52) U.S. Cl.
CPC .......... *H04L 9/0643* (2013.01); *H04L 9/0825* (2013.01); *H04L 9/321* (2013.01); *H04L 63/12* (2013.01); *H04L 67/104* (2013.01)

(58) Field of Classification Search
CPC ..... H04L 67/104; H04L 9/006; H04L 9/3239; H04L 2209/38; G07F 17/329; G07F 17/326; G07F 17/3241; G06F 21/64; G06Q 50/34
See application file for complete search history.

(56) References Cited

U.S. PATENT DOCUMENTS

| | | | |
|---|---|---|---|
| 2019/0057382 A1* | 2/2019 | Wright | H04L 9/0637 |
| 2019/0188653 A1* | 6/2019 | Khaund | H04L 9/3297 |
| 2020/0019963 A1* | 1/2020 | Nakamura | G06Q 20/3823 |

* cited by examiner

SYSTEMS AND METHODS FOR BLOCKCHAIN-BASED DIGITAL LOTTERY TICKET GENERATION AND DISTRIBUTION

FIELD

The present inventive concepts relate to the generation, distribution, tracking and redemption of lottery tickets in a lottery system.

BACKGROUND

Conventional lottery systems generate printed paper tickets or slips for players to represent entries in the lottery. The paper tickets are typically generated by point of sale systems operated by lottery operators and/or their licensees. Accordingly, various lottery systems incorporating tickets for lottery games have been described.

For example, U.S. Pat. No. 5,818,026 to Melling et al. discloses a system and method for capturing hand-marked cells from a lottery selection slip. The lottery slip includes a conventional play region of cells (labeled sequentially from 1 to 49, for example) for receiving indicia to be captured, after receiving indicia the play region of cells includes a plurality of occupied cells defined by marked cells and a plurality of non-occupied cells defined by unmarked cells. The lottery slip also includes row-identifier bar codes located at opposite boundaries of the play region. The bar codes are electro-optically scannable and readable and are arranged in a plurality of ordered rows tiered along the transverse direction over the transverse distance of the play region. A scanner is used to generate scan lines that extend over the play region of cells occupied by the indicia and over each bar code and for decoding the row identifier data for each scan line as each line transverses the boundaries of the play region of cells, the occupied cells having different light reflectivity than the non-occupied cells. A decoder captures the identity and the location of the occupied cells and the non-occupied cells and stores the digitized signal. A ticket receipt is then issued representative of the numbers selected by the player. By using a bar code scanner to read both the row identifier codes and the actual hand-marked play region the need for precise positioning within traditional terminals was obviated.

U.S. Pat. No. 5,156,397 to Valenza, Jr. discloses an apparatus for automated marking of bet slips for use in entering a customer wager into an independent lottery terminal includes a housing for receiving a bet slip. A selector actuatable by the customer is provided within the housing for permitting the customer to select a desired mode of operation from a plurality of alternative operational modes for marking the bet slip. A control within the housing communicates with the selector for identifying the mode selected by the customer and for generating electrical control signals in response to the selected mode. A printer within the housing communicates with the control for receiving the bet slip, for receiving the electrical control signals and for marking the bet slip in accordance with the received control signals.

U.S. Pat. No. 7,510,116 to Robb et al. discloses a method for conducting a dynamic lottery game that includes dispensing a dynamic lottery game ticket to a player. The dynamic lottery game ticket has indicia thereon corresponding to an entry for the player for a dynamic lottery game. The method includes reading player selection indicia on the dynamic lottery game ticket that corresponds to a dynamic lottery game selection for the player, and determining an outcome of the dynamic lottery game based on the player selection indicia. Robb et al. further disclose dispensing a continuation ticket to the player, the continuation ticket having indicia disposed thereon corresponding to the outcome of the dynamic lottery game for the player, reading the indicia corresponding to the outcome of the dynamic lottery game for the player, determining whether the outcome of the dynamic lottery game is a winning outcome based on the indicia corresponding to the outcome of the dynamic lottery game for the player, and dispensing value to the player in response to determining that the outcome of the dynamic lottery game for the player is a winning outcome.

SUMMARY

A method of generating a digital lottery ticket includes receiving a transaction record associated with a ticket issuance request from a computing device, wherein the transaction record may include transaction data including a player entry and a first public key associated with the player entry, generating a first message including digital ticket information, TKD, relating to the player entry, a source field and a destination field, generating a digital signature of the first message using a private key of an issuer server, transmitting the first message and the digital signature to a transaction certification authority, TCA, server, for storage on a publicly viewable transaction ledger maintained by the TCA, receiving from the TCA server a second message including a digital ticket number and a transaction ID associated with the first message and the digital ticket number, and transmitting a third message including the transaction ID and the digital ticket number to the computing device.

The method may further include retrieving a record from the publicly viewable transaction ledger associated with the transaction ID, and determining whether the record represents a valid transaction. Transmitting the third message may include transmitting the third message in response to determining that the record represents a valid transaction.

The digital signature may include a first digital signature, and wherein the first message is stored on the publicly viewable transaction ledger as a transaction record including the first message, the first digital signature of the first message, and a second digital signature of a fourth message including the first message and the first digital signature of the first message, wherein the second digital signature is generated using a private key of the TCA.

The source field may include a first public key of the ticket issuer, and the destination field may include a second public key associated with the computing device.

The TCA may have permissioned access to the publicly viewable transaction ledger.

The publicly viewable transaction ledger may have public read access rights.

Generating the digital signature may include generating a hash of the first message, and generating a digital signature of the hash of the first message with the private key of the issuer server.

A system for generating digital lottery tickets may include a memory device, and a processing device operatively coupled to the memory device. The device is configured to execute computer-readable program code to receive a transaction record associated with a ticket issuance request from a computing device, wherein the transaction record may include transaction data including a player entry and a first public key associated with the player entry, generate a first message including digital ticket information, TKD, relating to the player entry, a source field and a destination field, generate a digital signature of the first message using a private key of an issuer server, transmit the first message and the digital signature to a transaction certification authority, TCA, server, for storage on a publicly viewable transaction ledger maintained by the TCA, receive from the TCA server a second message including a digital ticket number and a transaction ID associated with the first message and the digital ticket number, and transmit a third message including the transaction ID and the digital ticket number to the computing device.

A system for managing digital lottery tickets may include a ticket issuer server including a first memory device and a first processing device operatively coupled to the first memory device, and a transaction certification server including a second memory device and a second processing device operatively coupled to the second memory device.

The ticket issuer server is configured to execute computer-readable program code to receive a transaction record associated with a ticket issuance request from a computing device, wherein the transaction record may include transaction data including a player entry and a first public key associated with the player entry, generate a first message including digital ticket information, TKD, relating to the player entry, a source field and a destination field, generate a digital signature of the first message using a private key of an issuer server, transmit the first message and the digital signature to a transaction certification authority, TCA, server, for storage on a publicly viewable transaction ledger maintained by the TCA, receive from the TCA server a second message including a digital ticket number and a transaction ID associated with the first message and the digital ticket number, and transmit a third message including the transaction ID and the digital ticket number to the computing device.

The transaction certification server is configured to receive the first message and the first digital signature, generate a second digital signature of the first message and the first digital signature using a private key of the transaction certification server, store the first message, the first digital signature and the second digital signature in a publicly viewable transaction ledger, and transmit the second message including the transaction ID and the digital ticket number to the ticket issuer server.

A method of transferring a digital lottery ticket from a first computing device to a second computing device includes receiving a second public key of the second computing device, retrieving a digital ticket information, TKD, associated with the digital lottery ticket, generating a first message including the TKD, a source field including a first public key of the first computing device and a destination field including the second public key of the second computing device, generating a digital signature of the first message using a private key of the first computing device, transmitting the first message and the digital signature to a transaction certification authority, TCA, server, for storage on a publicly viewable transaction ledger maintained by the TCA, receiving from the TCA server a second message including a digital ticket number and a transaction ID associated with the first message and the digital ticket number, and transmitting a third message including the transaction ID and the digital ticket number to the second computing device.

The method may further include retrieving a record from the publicly viewable transaction ledger associated with the transaction ID, and determining whether the record represents a valid transaction. Transmitting the third message may include transmitting the third message in response to determining that the record represents a valid transaction.

The digital signature may include a first digital signature, and wherein the first message is stored on the publicly viewable transaction ledger as a transaction record including the first message, the first digital signature of the first message, and a second digital signature of a fourth message including the first message and the first digital signature of the first message, wherein the second digital signature is generated using a private key of the TCA.

Generating the digital signature may include generating a hash of the first message, and generating a digital signature of the hash of the first message with the private key of the issuer server.

A method of operating a transaction certifying authority, TCA, server for managing digital lottery ticket records includes receiving a message from a lottery ticket issuer server, the message including digital ticket information, TKD, regarding a digital lottery ticket that is being issued by the lottery ticket issuer server, a source field identifying a source of the digital lottery ticket and a destination field identifying a destination of the digital lottery ticket, and a digital signature of the lottery ticket issuer server, verifying the digital signature of the lottery ticket issuer server, generating a second digital signature of the message and the first digital signature using a private key of the transaction certification server, storing the message, the first digital signature and the second digital signature in a publicly viewable transaction ledger, and transmitting a second message including the transaction ID and the digital ticket number to the lottery ticket issuer server. The second message may include the digital ticket information, TKD.

Storing the message, the first digital signature and the second digital signature in a publicly viewable transaction ledger may include generating a transaction record and storing the transaction record in the publicly viewable transaction ledger.

Storing the transaction record in the publicly viewable transaction ledger may include retrieving a hash value of a previous block in the publicly viewable transaction ledger, assembling a plurality of transaction records and the hash value of the previous block into a new block, generating a hash of the new block, and storing the new block in the publicly viewable transaction ledger.

The publicly viewable transaction ledger may include a permissioned ledger.

DETAILED DESCRIPTION OF EMBODIMENTS

Figure 1A:
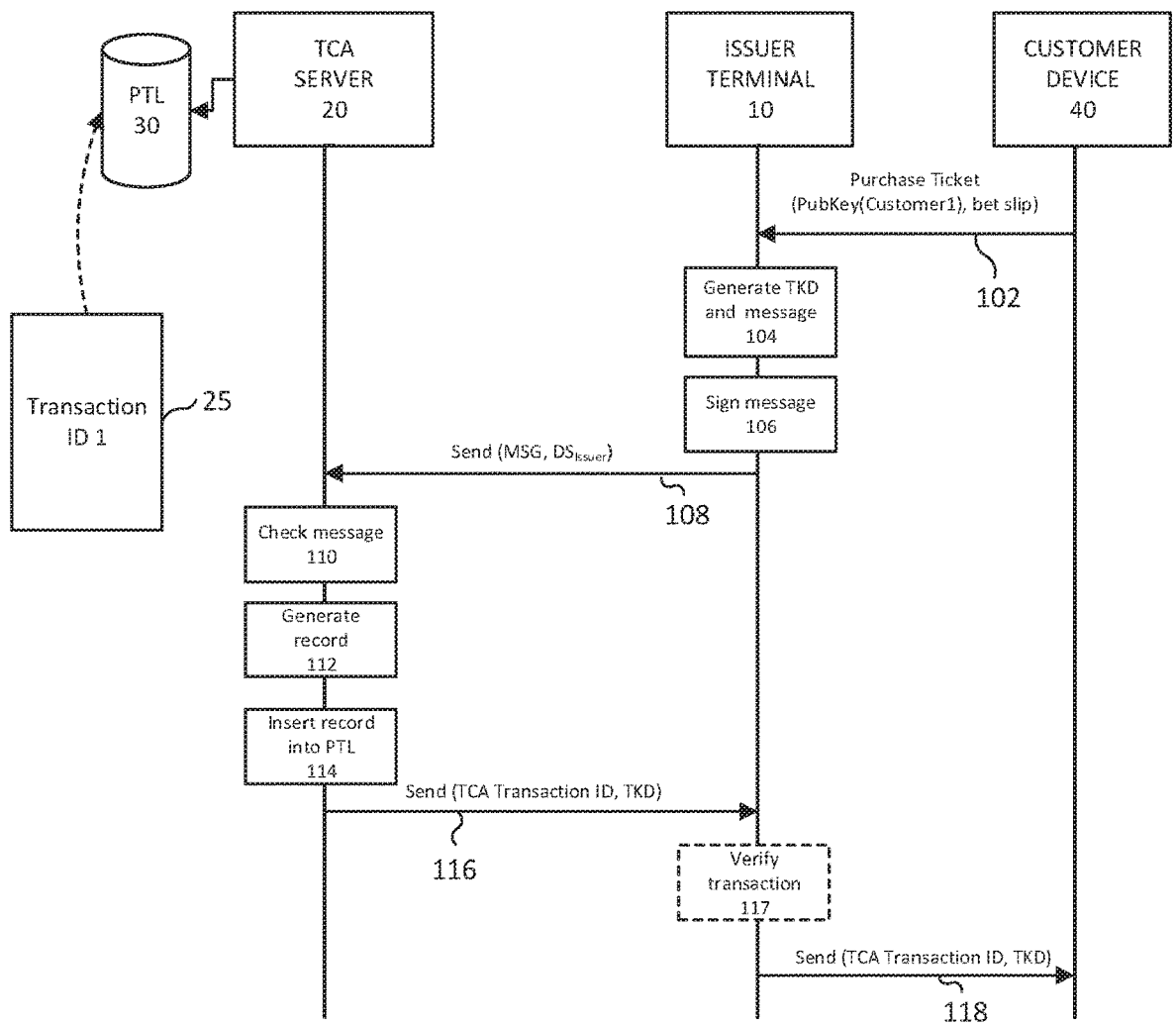
FIG. 1A illustrates message flows and operations of various elements of a digital lottery ticket system for generating a digital lottery ticket in accordance with some embodiments.

As noted above, conventional lottery systems issue physical items, in the form of paper tickets or slips to players to represent a player's entry or entries in the lottery. A paper lottery ticket typically includes information identifying the player's entry, which is typically represented as a string of numbers. A lottery ticket also typically includes an identification of the game in which the player is entered, the date of a drawing for prizes, a timestamp indicating when the ticket was issued, and the amount of money wagered. A lottery ticket may include a single entry or multiple entries into the lottery. Other information may be provided on the ticket, such as a serial number identifying the ticket and a machine-readable code, such as a bar code or QR code, in which various items of information are encoded. To reduce fraud, the lottery operator may use the machine-readable code or other information on a ticket to verify that the ticket is genuine when it is presented for redemption.

Depending on the rules of the lottery game in question, physical paper tickets may act as bearer instruments that can be transferred by the player or redeemed if they represent a winning entry. Although lottery tickets provide a convenient record of a lottery entry, conventional paper lottery tickets have a number of drawbacks. For example, in order to redeem a winning ticket, it is typically required for the owner of the ticket to physically present the ticket to the lottery operator or their agent. A physical lottery ticket may be lost, misplaced or stolen, with the result that the owner of the lottery ticket may be unable to redeem a winning lottery ticket. Moreover, because lottery tickets are typically made from paper, they may be easily damaged to the point of being rendered useless by liquids or by being ripped, torn or otherwise physically damaged.

The present inventive concepts provide systems and methods for generating, distributing and transferring digital lottery tickets as an alternative to physical tickets. Like a physical ticket, a digital ticket may represent one or more entries into a lottery game. However, unlike a physical ticket, a digital ticket as described herein may be immune from physical damage or loss but still be easily transferable and redeemable by the owner. Moreover, a record of the ownership, including transfer of ownership, of the lottery ticket may be maintained by the lottery operator in a manner that may promote efficiency and/or transparency of the lottery operation.

In a lottery system according to some embodiments, digital lottery tickets, or digital tickets, are generated by a ticket issuer, and a record of the ticket is stored in a publicly viewable transaction ledger by a transaction certification authority (TCA). As will be described in more detail below, the publicly viewable transaction ledger may be implemented using a private, public, or semi-public blockchain.

The integrity of the publicly viewable transaction ledger may be enhanced by storing groups of ticket transactions in digitally signed blocks that are linked together using respective hash signatures to form a transaction record that is both publicly available and tamper-resistant. In some embodiments, only the TCA has authority to add records to the publicly viewable transaction ledger. However, in other embodiments, other entities may be authorized to generate blocks to be added to the publicly viewable transaction ledger based on proof-of-work, proof-of-stake, explicit signing authority, or some other means.

Systems/methods according to some embodiments can be used at a retail point of sale system to generate a digital ticket for an entrant, also referred to herein as a "digital ticket holder." A copy of the digital ticket can be stored, for example, on a mobile device belonging to the entrant. However, it will be appreciated that since a record of the digital ticket is stored on the publicly viewable transaction ledger, and only a copy of the digital ticket may be stored on the entrant's device, the digital ticket will not be lost even if the entrant's mobile device is lost, damaged or stolen.

Systems and methods for issuing, transferring and redeeming digital lottery tickets as described herein may satisfy regulatory requirements as well as security and business requirements, as the publicly viewable transaction ledger provides an immutable record of the existence, ownership and redemption of lottery tickets within the ecosystem. Moreover, the systems/methods described herein can be combined with an existing lottery infrastructure to provide enhanced security and/or auditability. Security and business requirements of a lottery system include anonymity, confidentiality, integrity, non-repudiation, process transparency and reproducibility and portability. As will be evident from the following disclosure, a digital lottery ticket system as described herein can meet one or all of these requirements.

As used herein, a transaction ledger refers to a database that records one or more transactions relating to lottery tickets, including issuance, transfer and redemption. The transaction ledger may be implemented using a blockchain, which utilizes cryptography, message hashing, and digital signatures to verify the authenticity and accuracy of transactions recorded in the ledger and to make the records resistant to tampering. A transaction ledger can be characterized by the nature of entities that are allowed to view and/or update the transaction ledger. In general, a transaction ledger may be a private ledger if it may only be viewed or updated by an owner. A transaction ledger that can only be updated by authorized entities may be referred to as a "permissioned ledger," while or a ledger that can be updated by any entity may be referred to as a "public ledger." As used herein, a "publicly viewable transaction ledger" refers to a transaction ledger that is publicly viewable, but that may only be updated by an authorized entity. Thus, a "publicly viewable transaction ledger" may be considered to be a permissioned ledger that can be viewed by any entity.

In general, systems/methods according to the inventive concepts employ a model including an issuer that is authorized to issue lottery tickets, one or more customers who purchase lottery tickets, and a transaction certification authority (TCA), which acts as a digital notary that authenticates transactions initiated by a customer or issuer. Each actor in the ecosystem is identified by a public/private key pair. As known in the field of cryptography, public/private key pairs are related keys that can be used to encrypt and decrypt plain text and to generate digital signatures of messages. For example, a plaintext message that is encrypted with a public key can be decrypted with the corresponding private key. However, it is computationally infeasible to derive the private key from the public key. Thus, the public key can be shared freely provided the secrecy of the private key is maintained.

Moreover, a message can be digitally signed using the private key, and the signature can be verified using the public key. Thus, the authenticity of a message can be validated by a digital signature without sharing the private key.

In the systems/methods described herein, each transaction recorded in the transaction ledger represents the transfer of ownership of a digital ticket, TKD, from one entity to another. For example, when a TKD is generated, the transaction represents a transfer of the TKD from the issuer to the customer. A TKD can be transferred from one customer to another, and the transaction may be stored as a record on the transaction ledger. Finally, when a winning ticket is redeemed (or cashed in), a transaction is recorded on the transaction ledger that represents a transfer of the TKD from the customer back to the issuer. Each transaction associated with a particular TKD in the transaction ledger is linked to every other transaction associated with the TKD through identification of the public keys of the source and destination entities. Moreover, each transaction in the transaction ledger is authorized by the digital signatures of both the source entity and the TCA by means of digital signatures. Multiple transactions are grouped into blocks, which are linked together by block hashes to form a blockchain.

As will be appreciated, systems/methods as described herein can meet one or more of the business requirements described above. For example, systems/methods as described herein can provide anonymity to lottery players, because each actor in the system, including customers, is identified in the transaction ledger only by their public key. Integrity of the system may be assured by the fact that each transaction stored on the transaction ledger is digitally signed and cannot be altered without breaking the signature. Details of the lottery ticket may be kept confidential, because all or part of the information of a digital ticket may be encrypted. Transfers of lottery tickets may be authenticated by the digital signatures of the transferring party and the TCA; thus, a transferring party may not be able to repudiate a transfer, leading to enhanced stability and reliability of the system with fewer opportunities for conflicts to arise. The entire process has both transparency and reproducibility, due to the fact that the transaction ledger is publicly viewable. Any interested party can examine the transaction ledger to verify the authenticity of a given transaction. Moreover, because the TCA acts as a certifying authority, the problem of "double-spend", i.e., trying to transfer the same TKD twice, is precluded. Finally, the transaction ledger is tamper resistant, since any attempt to change a past transaction will be immediately evident to any observer of the transaction ledger. Some or all of these features may enhance the overall computational efficiency associated with issuing, tracking and managing lottery tickets.

In a system according to some embodiments, a digital ticket holder can transfer a digital ticket independently of the ticket issuer by generating a ticket transfer transaction and sending the transaction directly to the transaction certification authority, which can update the publicly viewable transaction ledger to reflect the transaction. This may also increase the computational efficiency of the system.

When a digital ticket is redeemed by the ticket holder, the digital ticket is verified by reference to the record in the publicly viewable transaction ledger. According to some embodiments, the winning amount may be paid to the registered holder of the digital ticket based on the record in the publicly viewable transaction ledger. In this way, disputes over ticket ownership may be avoided.

Embodiments of the inventive concepts provide systems/methods that may enhance the integrity of the ticket distribution system and/or allow for more accurate and quicker verification of ticket ownership. The storage of ticket issuance and transfer records in a publicly viewable transaction ledger may promote transparency and repeatability, and the system may also increase the portability and/or transferability of the digital tickets.

As will be described in more detail below, each transaction is linked to previous ownership, so that the chain of title of any given TKD can be derived from the publicly viewable transaction ledger. Each transaction is authorized by the TCA and the source using digital signatures.

Figure 1B:
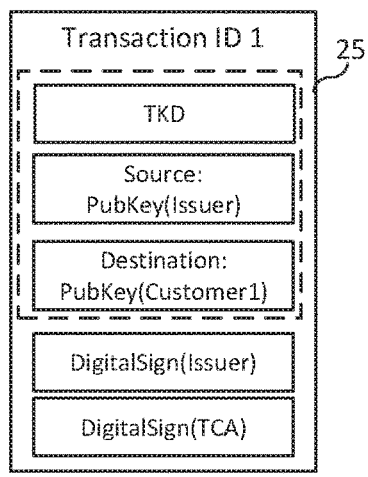
FIG. 1B illustrates transaction records generated by a digital lottery ticket system in accordance with some embodiments.

Referring to FIGS. 1A and 1B, a ticket issuing system according to some embodiments is illustrated. The system includes a ticket issuer terminal 10 and a transaction certification authority (TCA) server 20. The TCA server 20 manages a publicly viewable transaction ledger (PTL) 30 that stores records of digital tickets issued by the ticket issuer terminal 10. A digital lottery ticket may be issued by the ticket issuer terminal 10 to a customer device 40 that is operated by a ticket purchaser. As will be described in more detail below, each device that participates in the system has an associated public key/private key combination that allows transactions initiated or certified by the device to be publicly verified.

Each transaction in the digital lottery ticket system, including the original issuance of a digital lottery ticket, is represented by a transaction that involves a source (SOURCE), a destination (DESTINATION), and digital ticket (TKD) that contains information about the lottery entry, such as a bet slip number, ticket number, date, amount wagered, selected numbers, etc. At issuance, the digital ticket is generated by the issuer terminal 10 and transferred to the customer device 40. When a digital ticket is generated, a transaction is created by the issuer terminal 10 that represents the issuance of the digital ticket. The transaction is signed by the issuer terminal 10 and transmitted by the issuer terminal 10 to the TCA server 20, which stores a record 25 of the transaction in a publicly accessible publicly viewable transaction ledger 30. The record 25 stored in the PTL 30 provides evidence of ownership of the digital ticket by the customer. Although the publicly viewable transaction ledger 30 is publicly accessible, the only identifying information in the record is the public key of the customer. Accordingly, it is not possible to connect any digital ticket record to an individual absent knowledge of the individual's public key.

Still referring to FIGS. 1A and 1B, a process for generating a digital ticket is illustrated. Referring to FIGS. 1A and 1B, a customer device 40 ("Customer1") initiates a purchase of a digital lottery ticket by providing information about the purchase to an issuer terminal 10 along with a public key of the customer ("PubKey(Customer1)"). The information about the purchase may include such information as selected numbers, number of entries, whether a bonus or extra game is being played, etc. The information may be provided on a paper bet slip, or may be provided electronically by the customer device 40. The issuer terminal 10 may receive the information about the purchase and the public key of the customer device 40 at a point of sale device, such as an electronic terminal or kiosk that is typically operated by an agent or licensee of the issuer. When the issuer terminal 10 receives the information about the purchase and the customer's public key, the issuer terminal 10 generates a digital ticket (TKD) describing the entry and a digital message (MSG) that includes the digital ticket TKD, the public key of the customer ("PubKey(Customer1)") and also a public key associated with the issuer ("PubKey(Issuer)"), shown in block 104. It will be appreciated that in some embodiments, the message MSG, or any portion thereof, may be encrypted by the customer to preserve the privacy of the information. In particular, the information may be encrypted using the public key of the issuer terminal 10.

Next, the issuer server 10 signs the message by generating a digital signature ("$DS_{Issuer}$") of the message in block 106. The generation of a digital signature of a message may involve two steps. First a message digest is created, for example, by applying a hashing algorithm (or hash function) to the message. The output of the hashing algorithm is a fixed length string that is uniquely associated (with high probability) with the message. Generating a message digest ensures integrity of the message because the hash function is designed so that if the message is altered, the message digest will change in an unpredictable manner. Additionally, the hashing function is designed so that it is not computationally feasible to derive the original message from the message digest. Once the message digest has been created, the message digest is encrypted using the private key of the issuer terminal 10 to generate the digital signature of the message. That is, the signature is generated using the following operations:

MSGDigest=hash(MSG)

$DS_{Issuer}$=Enc(PriKey(Issuer), MSGDigest))

At block 108, the issuer terminal 10 sends a ticket registration message to the TCA server 20 informing the TCA server 20 of the issuance of the digital ticket. The ticket registration message includes the message MSG including the digital ticket TKD and the public keys of the issuer and the customer, along with the digital signature of the issuer terminal 10, $DS_{Issuer}$. The identity of the hash function used to generate the message digest may also be appended to the digital signature.

When the TCA server 20 receives the ticket registration message, the TCA server 20 first checks the integrity of the ticket registration message at block 110. The check function used to check the integrity of the message takes the message, the digital signature of the message generated by the issuer terminal 10 ($DS_{Issuer}$), and the public key of the issuer as inputs and generates an output that indicates whether or not the message is authentic, i.e., the check function determines whether the message that is received was in fact the message signed by the issuer terminal 10. If the TCA server 20 determines that the message is not genuine, the TCA server 20 may reject the transaction. Once the TCA server 20 is satisfied that the message is authentic, the TCA server 20 generates its own digital signature of the message by applying the following operations:

MSGDigest=hash(MSG)

$DS_{TCA}$=Enc(PriKey(TCA), MSG Digest))

where PriKey(TCA) is the private key of the TCA server 20. It will be appreciated that the hash function used by the TCA server 20 to generate the message digest MSGDigest in the generation of the digital signature of the TCA, $DS_{TCA}$, may be the same as or different from the hash function used by the issuer terminal 10 to generate the first message digest used to generate the issuer's digital signature, $DS_{Issuer}$.

The TCA server 20 then at block 112 generates a unique transaction identifier, or transaction ID, associated with the transaction and builds a record 25 including the transaction ID, the ticket data TKD, the digital signature of the issuer, $DS_{Issuer}$, and the digital signature of the TCA, $DS_{TCA}$. The record 25 also identifies the source of the ticket as the public key of the issuer terminal 10 (PubKey(Issuer)) and the destination of the ticket as the public key of the customer device 40 (PubKey(Customer1)).

At block 114, the TCA server 20 inserts the record into the publicly viewable transaction ledger, PTL, 30. The publicly viewable transaction ledger 30 may be viewable by the public and/or by regulatory authorities; accordingly, any interested entity can verify the validity, existence and ownership of a lottery ticket transaction that is stored in the PTL 30. Given the properties of public-key encryption and hashing, any entity examining a transaction in the PTL 30 can verify that the message has been authenticated by both the issuer terminal 10 and the TCA server 20.

After storing the record 25 in the PTL 30, the TCA server 20 sends a message 116 back to the issuer terminal 10 containing the transaction ID and the ticket data TKD. This message confirms to the issuer terminal 10 that the transaction was accepted by the TCA server 20 and stored in the PTL 30. Optionally, at block 117, the issuer terminal 10 may verify that the transaction has been recorded in the PTL 30 by querying the PTL 30 with the transaction ID.

The issuer terminal 10 then provides the transaction ID and the ticket data TKD to the customer device 40, for example, in an electronic message 118 to the customer device 40. The customer device 40 may then verify that the transaction has been recorded in the PTL 30 by querying the PTL 30 for the transaction ID.

Figure 2A:
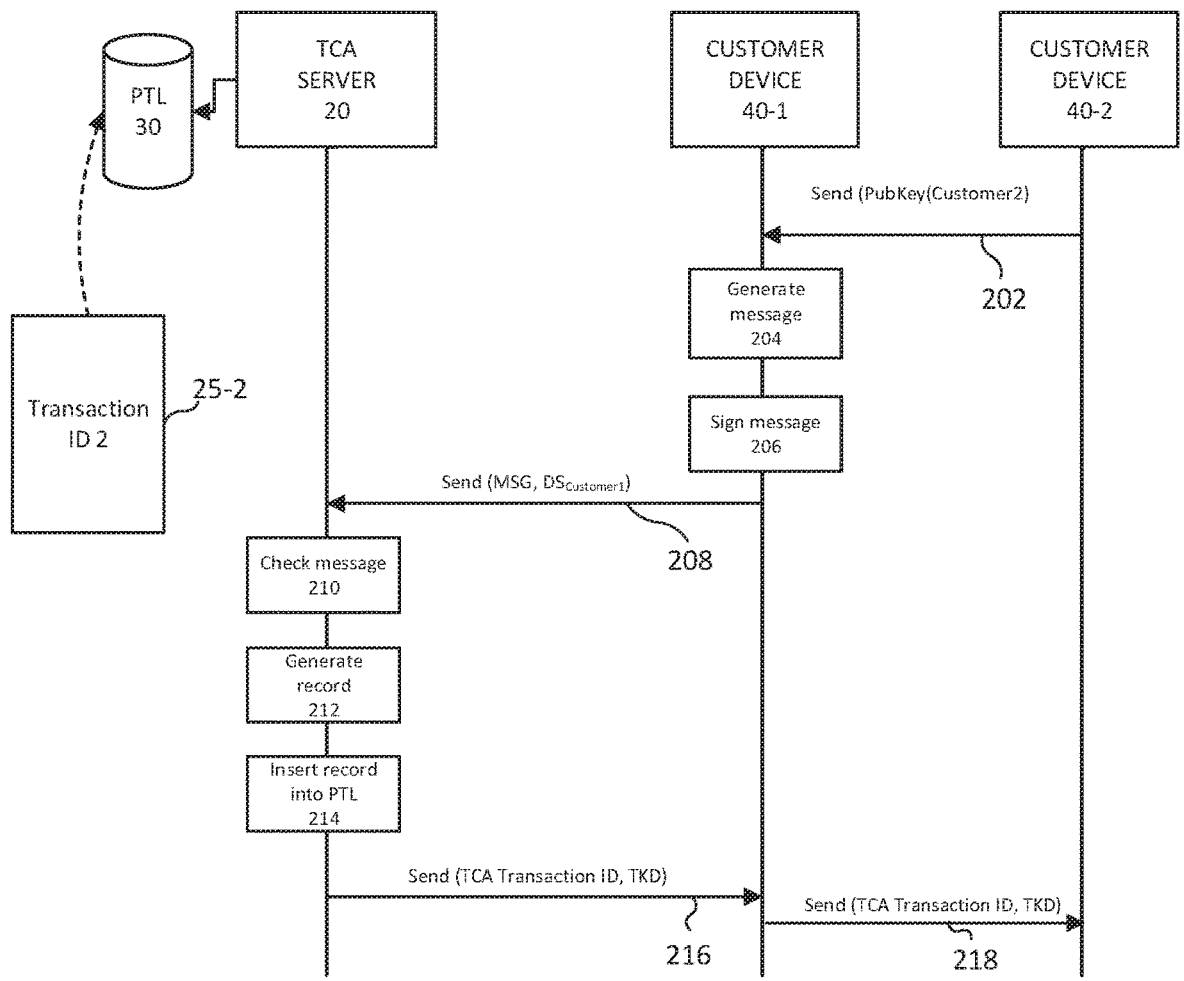
FIG. 2A illustrates message flows and operations of various elements of a digital lottery ticket system for transferring a digital lottery ticket in accordance with some embodiments.
Figure 2B:
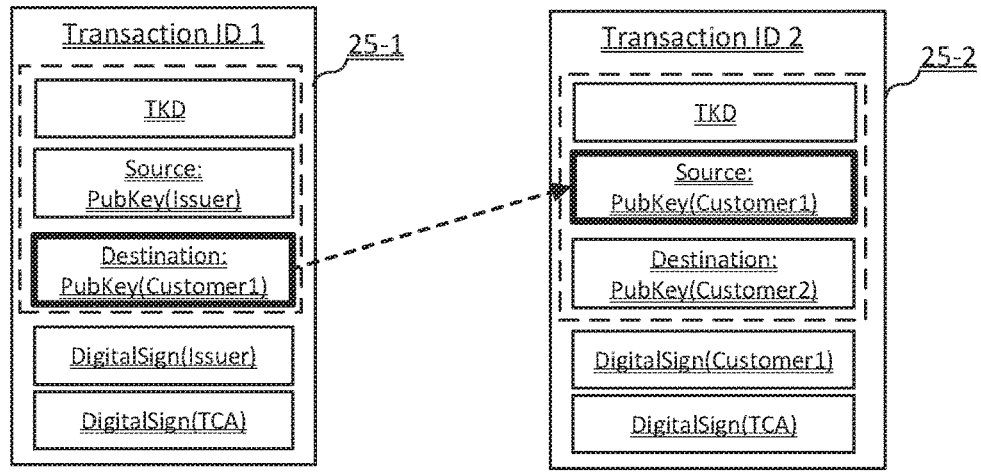
FIG. 2B illustrates transaction records generated by a digital lottery ticket system in accordance with some embodiments.

FIGS. 2A and 2B illustrate a process for transferring a digital lottery ticket from one customer device to another customer device. As will be appreciated, in a system according to some embodiments, the issuer terminal 10 does not need to be involved in in the transfer process. Referring to FIG. 2A, when a lottery ticket holder, such as a first customer device 40-1 (Customer1) desires to transfer a lottery ticket to a second customer device 40-2 (Customer2), the first customer device 40-1 first obtains the public key of the second customer device 40-2 (PubKey(Customer2)) in a message 202.

At block 204, the first customer device 40-1 then retrieves ticket data (TKD) describing the digital lottery ticket being transferred, for example, from a mobile device operated by the first customer device 40-1 on which the ticket data TKD is stored. The first customer device 40-1 then generates a digital message (MSG) that includes the ticket data TKD, the public key of the second customer device ("PubKey(Customer2)") and it's own public key ("PubKey(Customer1)"). The message may further include the transaction ID of the transaction in which the digital ticket was issued or otherwise transferred to the first customer device 40-1 ("Transaction ID 1").

Next, the first customer device 40-1 generates a digital signature ("$DS_{Customer1}$") of the message in a similar manner as that described above for the issuer. In particular, the first customer device 40-1 generates a message digest by applying a hashing algorithm to the message. Once the message digest has been created, the message digest is encrypted using the private key of the first customer device 40-1 to generate the digital signature of the message at block 206. That is, the signature is generated using the following operations:

MSGDigest=hash(MSG)

$DS_{Customer1}$=Enc(PriKey(Customer1), MSGDigest))

At block 208, the first customer device 40-1 sends a ticket transfer message 206 to the TCA server 20 informing the TCA server 20 that the digital lottery ticket should be transferred to the second customer device 40-2 as identified by the public key of the second customer device 40-2, PubKey(Customer2) included in the message. The ticket transfer message includes the message MSG including the ticket data TKD and the public keys of the first customer device 40-1 and the second customer device 40-2 (and optionally the transaction ID of the previous transaction, i.e., Transaction ID 1), along with the digital signature $DS_{Customer1}$ of the first customer device 40-1. The identity of the hash function used to generate the message digest may also be appended to the digital signature.

When the TCA server 20 receives the ticket transfer message, the TCA server 20 first checks the integrity of the ticket transfer message at block 210. The check( ) function used to check the integrity of the message takes the message, the digital signature of the message generated by the first customer device 40-1 ($DS_{Customer1}$), and the public key of the first customer device 40-1 as inputs and generates an output that indicates whether or not the message is authentic. If the TCA server 20 determines that the message is not genuine, the TCA server 20 may reject the transaction. Once the TCA server 20 is satisfied that the message is authentic, the TCA server 20 generates its own digital signature of the message, $DS_{TCA}$, by applying the following operations:

MSGDigest=hash(MSG)

$DS_{TCA}$=Enc(PriKey(TCA), Digest))

where PriKey(TCA) is the private key of the TCA server 20. It will be appreciated that the hash function used by the TCA server 20 to generate the message digest MSGDigest in the generation of the digital signature of the TCA, $DS_{TCA}$, may be the same as or different from the hash function used by the first customer device 40-1 to generate the first message digest used to generate the digital signature, $DS_{Customer1}$, of the first customer device 40-1.

The TCA server 20 then generates a unique transaction identifier, or transaction ID, ("Transaction ID 2") associated with the ticket transfer transaction and stores at block 208. The TCA server 20 then generates at block 212 a record 25-2 including the new transaction ID, the digital ticket TKD, the digital signature of the first customer device 40-1, $DS_{Customer1}$, and the digital signature of the TCA, $DS_{TCA}$, and stores the record in the publicly viewable transaction ledger 30 at block 214. The record 25-2 also identifies the source of the ticket as the public key of the first customer device 40-1 (PubKey(Customer1)) and the destination of the ticket as the public key of the second customer (PubKey(Customer2)).

After storing the record 25-2 in the PTL 30, the TCA server 20 sends a message 216 back to the first customer device 40-1 containing the transaction ID and the digital ticket TKD. This message confirms to the first customer device 40-1 that the transaction was accepted by the TCA server 20 and stored in the PTL 30. The first customer device 40-1 then provides the new transaction ID (Transaction ID 2) and the digital ticket data TKD to the second customer device 40-2, for example, in an electronic message 218 to the second customer device 40-2. The second customer device 40-2 may then verify that the transaction has been recorded in the PTL 30 by searching the PTL 30 for the new transaction ID.

Figure 3:
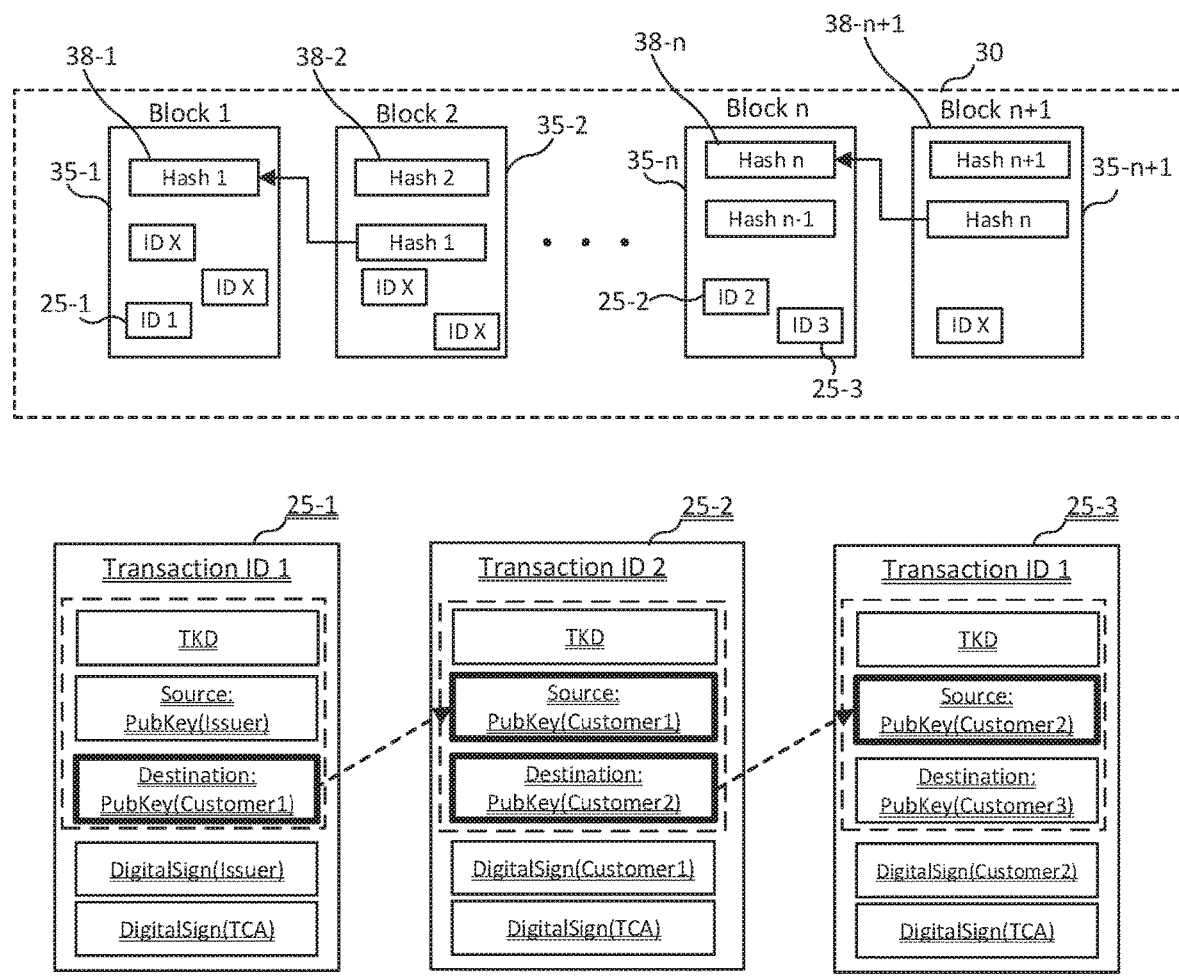
FIG. 3 illustrates aspects of a publicly viewable transaction ledger used in a digital lottery ticket system in accordance with some embodiments.

An example structure of a publicly viewable transaction ledger 30 is illustrated in FIG. 3. The PTL 30 may be managed by the TCA 20, which may store a copy of the PTL 30 on, for example, a file server or other database. That is, there may in some embodiments be only a single copy of the PTL 30 that is publicly available. In some embodiments, only the TCA 20 has authority to alter the PTL 30. As shown in FIG. 3, the PTL may be provided as a block chain, that is, a chain of linked blocks 35-1, 35-2, etc. Each of the linked blocks may be identified by a sequential block number, e.g., Block 1, Block 2, . . . , Block n, Block n+1, . . . as shown in FIG. 3. Each of the blocks includes a plurality of transactions 38-1, 38-2, etc., However, in other embodiments, multiple copies of the PTL 30 may be made and stored on other servers, so that the PTL 30 is a distributed ledger in some embodiments. Transactions in the publicly viewable transaction ledger 30 are periodically grouped into blocks which are signed by the TCA 30 and linked to previous blocks to create a tamper-resistant blockchain. As will be explained below, because the publicly viewable transaction ledger is distributed publicly, even the TCA 30 cannot retroactively change the contents of the publicly viewable transaction ledger 30, but can only add new blocks to the PTL 30.

Referring to FIG. 3, the publicly viewable transaction ledger 30 is illustrated in more detail. The PTL 30 includes a plurality of blocks 35-1, 35-2, etc., each of which includes a plurality of transaction records 25-1, 25-2, etc., that were generated by the TCA 20 and that correspond to issuances or transfers of digital lottery tickets. Once the TCA 20 has collected a sufficient number of transactions, the TCA 20 compiles the transactions into a block and calculates a hash 38-1 of the collected transactions. As noted above, the hash value is a fixed length value that is uniquely associated with the input, which in this case is the group of transactions in the block. The block includes the transactions and the hash value, and is given a block number, e.g., Block 1, Block 2, etc. The size of a block may be arbitrary in that there may be no upper or lower limit on the size of a block. For example, a block may include only one transaction record 25 or multiple transaction records. In some embodiments, however, there may be an upper limit on the size of the blocks to limit memory/buffer requirements.

In some embodiments, the TCA 20 may be configured to generate one block in a given time period regardless of the number of records available to be placed into a block. For example, the TCA 20 may be configured to generate one block every n seconds. In some embodiments, the TCA 20 may be configured to generate at least one block every n seconds. Transactions received by the TCA 20 may be queued at the TCA 20, and a block may be generated when (i) a sufficient number of transactions are ready to be placed into a block or (ii) after a predetermined time period has elapsed, so that the amount of time a purchaser must wait for confirmation of the digital ticket is limited.

Still referring to FIG. 3, each block after the first block also includes the hash value of the previous block as part of its structure. Thus, for example, Block 2 includes the hash value, Hash 1, of Block 1. When the hash value of Block 2 is calculated, the hash value Hash 1 of Block 1 is included in the block. Thus, the hash value of Block 2 depends in part on the hash value of Block 1. In this way, any alteration of Block 1 will invalidate Block 2, since the hash of Block 1 will no longer be valid.

As more and more blocks are added to the PTL 30, the chain of hash dependencies grows. For example, because each block includes the hash of the previous blocks, all of the blocks become dependent on one another, so that a modification to any block will invalidate all subsequent blocks. In this way, any attempt to modify a previous transaction may be detected.

Transactions in the PTL 30 relating to a particular digital lottery ticket TKD are linked by the public keys of the source and destination of the TKD in each transaction. For example, still referring to FIG. 3, a digital lottery ticket TKD is generated in a transaction having transaction ID 1. The digital ticket TKD is generated by the issuer server 10 as evidenced by the fact that the issuer server 10 generated the digital signature that signed the transaction in the transaction 25-1. The transaction record 25-1 memorializing the issuance of the digital ticket TKD to the recipient is included in Block 1 of the PTL 30. At some time after issuance, the digital ticket was transferred from the first recipient (Customer1) to a new recipient (Customer2), as evidenced by the transaction record 25-2, which is stored in Block n of the PTL 30. The transaction is verified by the fact that the first recipient, Customer1, digitally signed the transaction. At some later time, the digital ticket was transferred from the second recipient (Customer2) to a third recipient (Customer3), as evidenced by the transaction record 25-3, which is also stored in Block n of the PTL 30. The transaction is verified by the fact that the second recipient, Customer2, digitally signed the transaction.

Figure 4A:
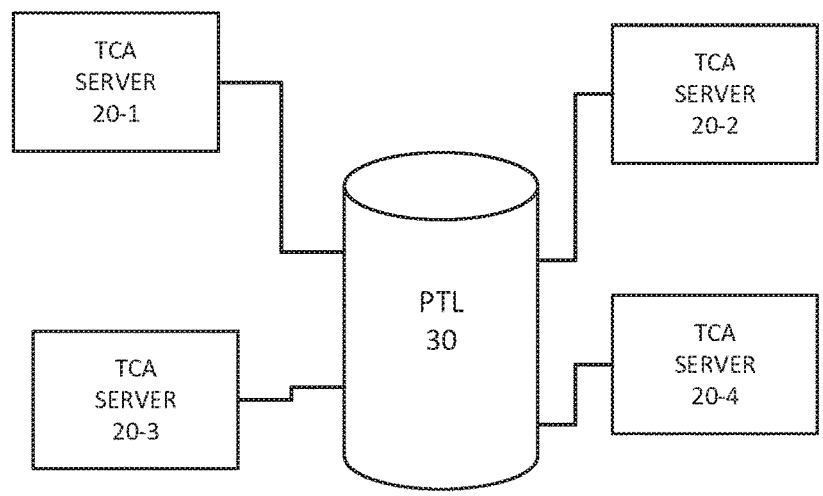
FIGS. 4A and 4B illustrate configurations of a publicly viewable transaction ledger used in a digital lottery ticket system in accordance with some embodiments.

The publicly viewable transaction ledger 30 may in some embodiments be a permissioned ledger, with the TCA server 20 being the only entity that has write-access to the publicly viewable transaction ledger 30. The PTL 30 may be made available to the public by, for example, publishing an IP address of the PTL 30 and permitting network access to the PTL 30 through the IP address. In other embodiments, the PTL 30 may be a permissioned ledger that may only be updated by authorized entities. For example, referring to FIG. 4A, multiple TCA servers 20-1, 20-2, 20-3, 20-4 may have permission to update the PTL 30, and blocks signed by any entity other than a permissioned entity may be rejected.

Figure 4B:
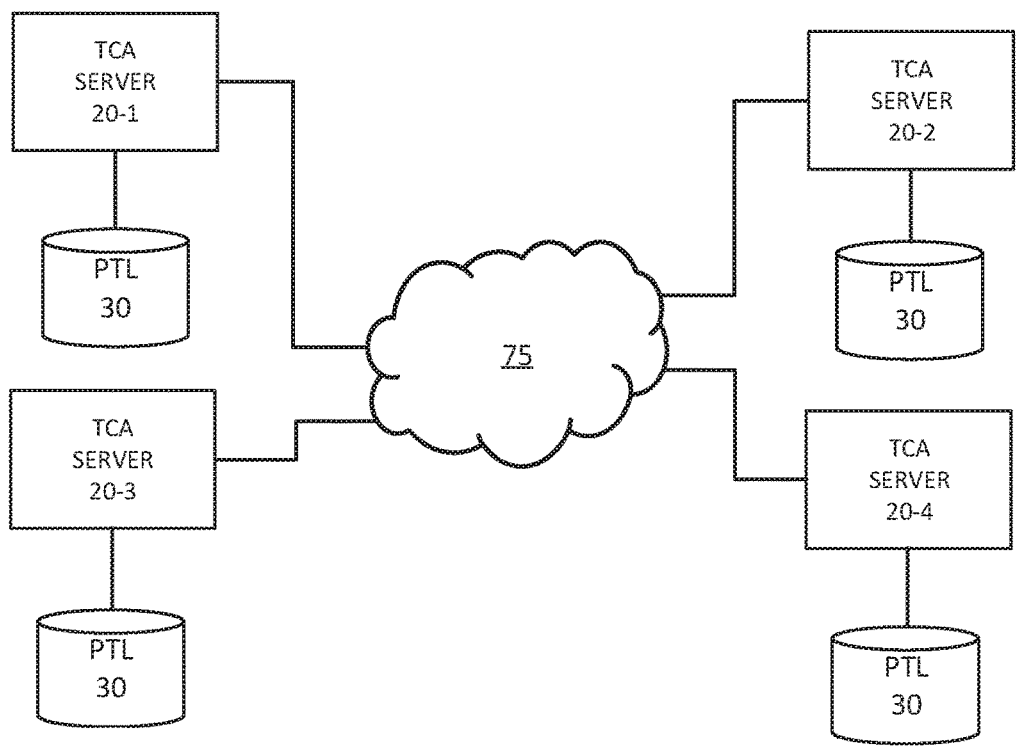

In still other embodiments, as shown in FIG. 4B, each TCA server 20 may maintain its own copy of the PTL 30. Each TCA server 20 may work to generate blocks of transactions, and when a TCA server 20 has generated a new block to be added to the PTL 30, the TCA server 20 may broadcast the block to the other TCA servers in the network. When a new block is received, each TCA server may validate the block by verifying the hash values and digital signatures in the block and, if the block is validated, add the block to the PTL 30 and move on to creating the next block.

Figure 5:
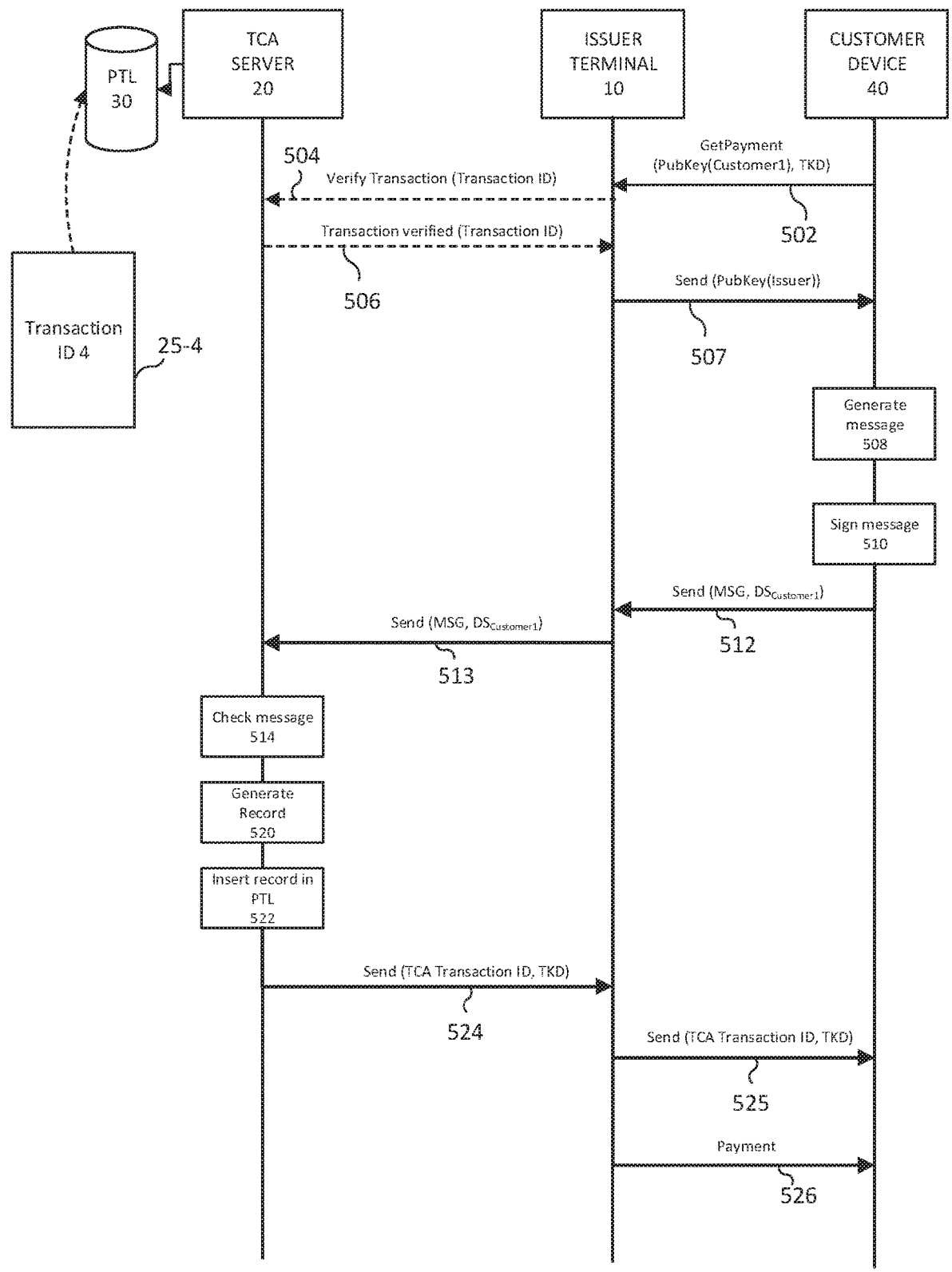
FIG. 5 illustrates message flows and operations of various elements of a digital lottery ticket system for redeeming a digital lottery ticket in accordance with some embodiments.

A process for redeeming a digital lottery ticket is illustrated in FIG. 5. The redemption process is similar to a transfer of the digital lottery ticket back to the issuer. As shown in FIG. 5, the redemption process is initiated when the customer device 40 to which the digital ticket TKD belongs issues a GetPayment message 502 to an issuer terminal 10. The GetPayment message includes the public key of the customer device 40 (PubKey(Customer1)) and the digital ticket TKD information. In some embodiments, the GetPayment message may also include a transaction ID of the transaction in which the customer device 40 received the digital ticket TKD. Moreover, in some embodiments, the GetPayment message and/or the digital ticket TKD is digitally signed by the customer device 40 to verify the authenticity of the request.

The issuer terminal 10 may optionally send a verify transaction message 504 with the transaction ID to the TCA server 20 to verify that the transaction exists and is the most recent transaction for the digital ticket in question. If the transaction is verified, the TCA server 30 responds with a message 506 informing the issuer terminal 10.

Next, the issuer terminal 10 sends its public key to the customer device 40 in a ticket transfer request message 507. The customer device 40 then generates a digital message (MSG) that includes the digital ticket TKD, the public key of the customer ("PubKey(Customer1)") and also a public key associated with the issuer ("PubKey(Issuer)"), shown in block 508. The customer device 40 signs the message by generating a digital signature ("$DS_{Customer1}$") of the message in block 510, authorizing the transfer of the ticket back to the issuer. The customer device 40 then sends the message MSG and the digital signature $DS_{Customer1}$ to the issuer terminal 10 in a message 512.

The issuer terminal 10 forwards the message MSG and the digital signature $DS_{Customer1}$ to the TCA server 20 in a message 513. The ticket redemption message includes the message MSG including the digital ticket TKD and the public keys of the issuer and the customer, along with the digital signature of the customer device, $DS_{Customer1}$. The identity of the hash function used to generate the message digest may also be appended to the digital signature.

When the TCA server 20 receives the message, the TCA server 20 first checks the integrity of the ticket registration message at block 514. If the TCA server 20 determines that the message is not genuine, the TCA server 20 may reject the transaction. To check the message, the TCA server 20 may retrieve the record of ownership of the digital ticket from the PTL 30. In particular the TCA server 20 may search the PTL 30 to find the transaction in which the digital ticket was issued and then find all subsequent transactions relating to the digital ticket. The TCA server 20 may then analyze the entire ownership history of the digital ticket to verify that the current registered owner of the digital ticket is the entity associated with the public key provided by the customer device 40. Once the TCA server 20 is satisfied that the message is authentic, the TCA server 20 generates its own digital signature of the message by applying the following operations:

MSGDigest=hash(MSG)

$DS_{TCA}$=Enc(PriKey(TCA), MSG Digest))

where PriKey(TCA) is the private key of the TCA server 20.

At block 520, the TCA server 20 generates a new record reflecting transfer of the digital ticket from the customer device 40 back to the issuer terminal 10.

At block 522, the TCA server 20 inserts the record into the PTL 30. After storing the record 25 in the PTL 30, the TCA server 20 sends a message 524 back to the issuer terminal 10 containing the transaction ID and informing the issuer terminal 10 that it is authorized to pay the winnings from the ticket. The issuer terminal 10 forwards the transaction ID to the customer device 40 in a message 525, and then pays the winnings to the customer device 40 at block 526. Payment may be made in any suitable fashion, such as by electronic payment, transfer of credits, or cash as appropriate.

Figure 6A:
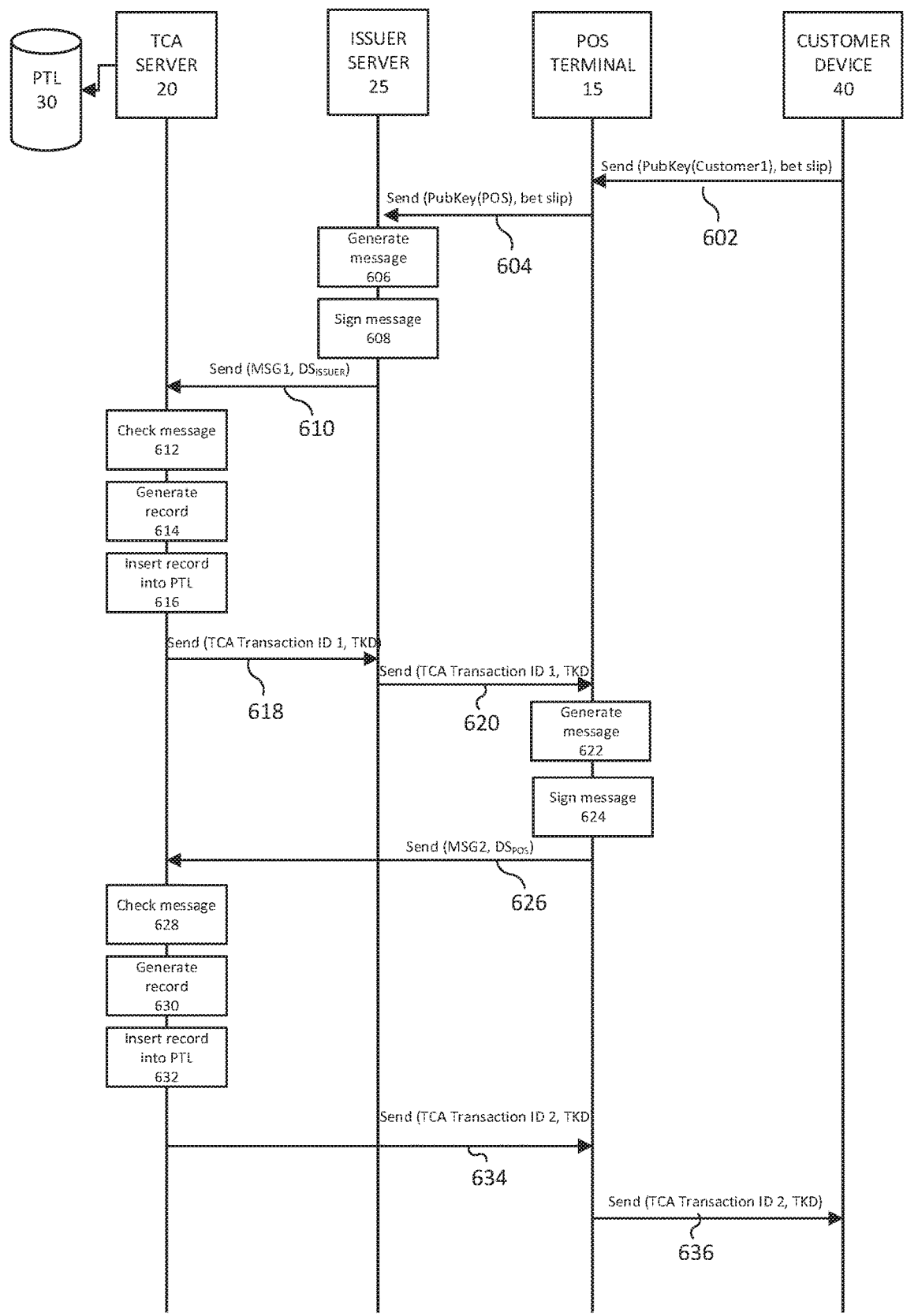
FIG. 6A illustrates message flows and operations of various elements of a digital lottery ticket system for generating a digital lottery ticket in accordance with further embodiments.
Figure 6B:
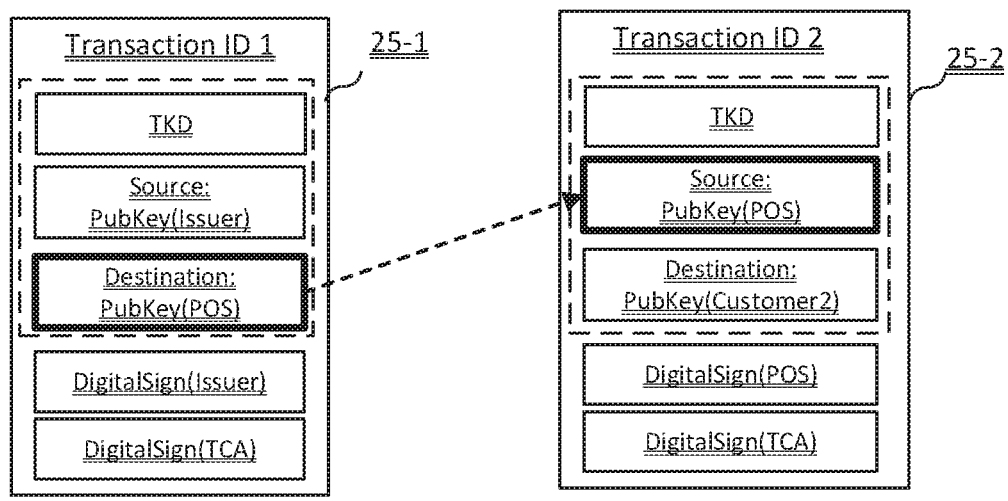
FIG. 6B illustrates transaction records generated by a digital lottery ticket system in accordance with some embodiments.

In some embodiments, a ticket may be issued by a point of sale (POS) terminal that is not operated by the issuer. In that case, it may be desirable to issue the lottery ticket in a two-step process in which a digital ticket is first issued to the POS terminal and then the digital ticket is transferred by the POS terminal to the purchaser. An example of such a method is illustrated in FIGS. 6A and 6B. As shown therein, a customer device 40 ("Customer1") initiates a purchase of a digital lottery ticket by providing information about the purchase to a POS terminal 15 along with a public key of the customer ("PubKey(Customer1)") in a message 602. The information about the purchase may include such information as selected numbers, number of entries, whether a bonus or extra game is being played, etc. The information may be provided on a paper bet slip, or may be provided electronically by the customer device 40.

The POS terminal 15 then transmits a message 604 to an issuer server 25 containing the bet information (i.e., the "bet slip") along with the public key of the POS terminal 15 (PubKey(POS)).

When the issuer server 25 receives the information about the purchase and the public key of the POS, the POS terminal 15 generates a digital ticket (TKD) describing the entry and a digital message (MSG1) that includes the digital ticket TKD, the public key of the POS ("PubKey(POS)") and also a public key associated with the issuer ("PubKey (Issuer)"), shown in block 606. It will be appreciated that in some embodiments, the message MSG, or any portion thereof, may be encrypted to preserve the privacy of the information. In particular, the information may be encrypted using the public key of the issuer server 25.

Next, the issuer server 25 signs the message by generating a digital signature ("DSIssuer") of the message in block 608. Next, the issuer server 25 sends a ticket registration message 610 to the TCA server 20 informing the TCA server 20 of the issuance of the digital ticket. The ticket registration message includes the message MSG including the digital ticket TKD and the public keys of the issuer server 25 and the POS terminal 15, along with the digital signature of the issuer server 25, $DS_{Issuer}$. The identity of the hash function used to generate the message digest may also be appended to the digital signature.

When the TCA server 20 receives the ticket registration message, the TCA server 20 first checks the integrity of the ticket registration message at block 612. If the TCA server 20 determines that the message is not genuine, the TCA server 20 may reject the transaction. Once the TCA server 20 is satisfied that the message is authentic, the TCA server 20 generates its own digital signature of the message by applying the following operations:

MSGDigest=hash(MSG)

DSTCA=Enc(PriKey(TCA), MSGDigest))

where PriKey(TCA) is the private key of the TCA server 20. It will be appreciated that the hash function used by the TCA server 20 to generate the message digest MSGDigest in the generation of the digital signature of the TCA, $DS_{TCA}$, may be the same as or different from the hash function used by the issuer server 25 to generate the first message digest used to generate the issuer's digital signature, $DS_{Issuer}$.

The TCA server 20 then at block 614 generates a unique transaction identifier, or transaction ID, associated with the transaction and builds a record 25 including the transaction ID, the ticket data TKD, the digital signature of the issuer, $DS_{Issuer}$, and the digital signature of the TCA, $DS_{TCA}$. The record 25 also identifies the source of the ticket as the public key of the issuer terminal 10 (PubKey(Issuer)) and the destination of the ticket as the public key of the POS terminal 15 (PubKey(POS)).

At block 616, the TCA server 20 inserts the record into the publicly viewable transaction ledger, PTL, 30. After storing the record 25 in the PTL 30, the TCA server 20 sends a message 618 back to the issuer server 25 containing the transaction ID (Transaction ID 1) and the ticket data TKD. This message confirms to the issuer server 25 that the transaction was accepted by the TCA server 20 and stored in the PTL 30. The issuer server 25 then provides the transaction ID and the ticket data TKD to the POS terminal 15, for example, in an electronic message 620 to the POS terminal 15.

Next, the POS terminal 15 initiates a transfer of the digital ticket to the customer device 40. In particular, the POS terminal 15 generates a digital message (MSG2) that includes the digital ticket TKD, the public key of the POS ("PubKey(POS)") and also a public key associated with the issuer ("PubKey(Customer1)"), shown in block 622.

Next, the POS terminal 15 signs the message by generating a digital signature ("$DS_{POS}$") of the message in block 624. Next, the POS terminal 15 sends a ticket transfer message 626 to the TCA server 20 informing the TCA server 20 of the transfer of the digital ticket. The ticket transfer message 626 includes the message MSG2 including the digital ticket TKD and the public keys of the customer device 40 and the POS terminal 15, along with the digital signature of the POS terminal, $DS_{POS}$. The identity of the hash function used to generate the message digest may also be appended to the digital signature.

When the TCA server 20 receives the ticket transfer message, the TCA server 20 first checks the integrity of the ticket transfer message at block 628. If the TCA server 20 determines that the message is not genuine, the TCA server 20 may reject the transaction. Once the TCA server 20 is satisfied that the message is authentic, the TCA server 20 generates its own digital signature of the message and, at block 630 generates a unique transaction identifier (Transaction ID 2) associated with the transaction and builds a record 25 including the transaction ID, the ticket data TKD, the digital signature of the POS terminal 15, $DS_{POS}$, and the digital signature of the TCA, $DS_{TCA}$. The record 25 also identifies the source of the ticket as the public key of the POS terminal 15 (PubKey(POS)) and the destination of the ticket as the public key of the customer device 40 (PubKey (Customer1)).

At block 632, the TCA server 20 inserts the record into the publicly viewable transaction ledger, PTL, 30. After storing the record 25 in the PTL 30, the TCA server 20 sends a message 634 back to the POS terminal 15 containing the transaction ID (Transaction ID 2) and the ticket data TKD. This message confirms to the POS terminal 15 that the transaction was accepted by the TCA server 20 and stored in the PTL 30. The POS terminal 15 then provides the transaction ID and the ticket data TKD to the customer device 40, for example, in an electronic message 636 to the customer device 40.

Figure 7:
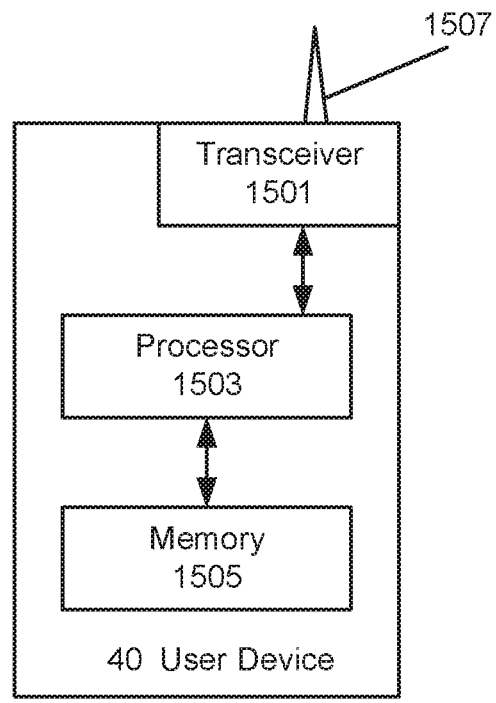
FIG. 7 is a block diagram illustrating some elements of a user device that may interoperate with a digital lottery ticket system in accordance with some embodiments.

FIG. 7 is a block diagram illustrating elements of a customer device 40 (also referred to as a wireless terminal, a mobile equipment (ME), a wireless communication device, a wireless communication terminal, user equipment, a user equipment node/terminal/device, etc.) configured to operate according to embodiments disclosed herein. As shown, the customer device 40 may include at least one antenna 1507 (also referred to as antenna), and at least one transceiver circuit 1501 (also referred to as transceiver) including a transmitter and a receiver configured to provide uplink and downlink radio communications with a base station or other radio transceiver element of a radio access network. The customer device 40 may also include at least one processor circuit 1503 (also referred to as processor) coupled to the transceiver 1501, and at least one memory circuit 1505 (also referred to as memory) coupled to the processor 1503. The memory 1505 may include computer readable program code that when executed by the processor 1503 causes the processor 1503 to perform operations according to embodiments disclosed herein for a customer device 40. According to other embodiments, processor 1503 may be defined to include memory so that a separate memory circuit is not required. The UE 1500 may also include an interface (such as a user interface) coupled with processor 1503.

As discussed herein, operations of the customer device 40 may be performed by processor 1503 and/or transceiver 1501. Alternatively, or additionally, the customer device 40 may include modules, e.g., software and/or circuitry, that performs respective operations (e.g., operations discussed herein with respect to example embodiments of customer devices 40).

Figure 8:
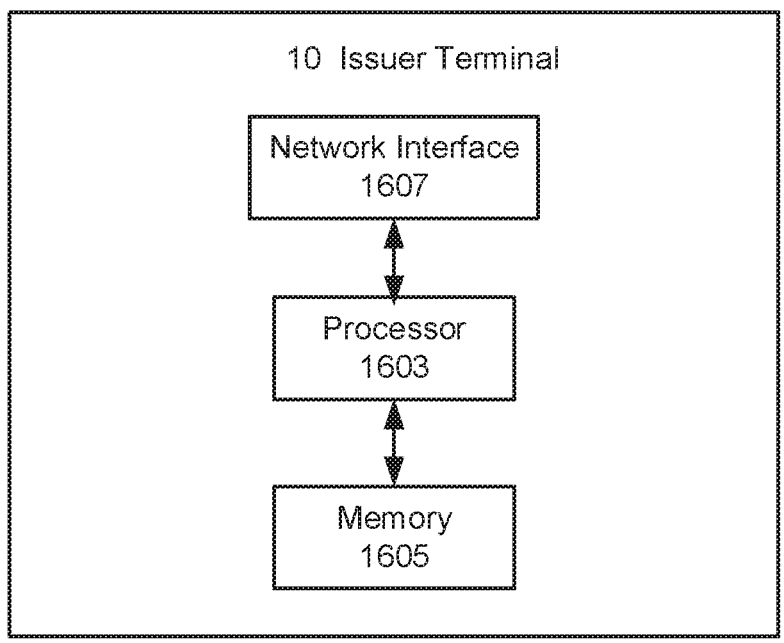
FIG. 8 is a block diagram illustrating some elements of an issuer terminal or server in a digital lottery ticket system in accordance with some embodiments.

FIG. 8 is a block diagram illustrating elements of an issuer terminal 10 according to one or more embodiments disclosed herein. As shown, the issuer terminal 10 may include at least one network interface circuit 1607 (also referred to as a network interface) configured to provide communications with other nodes, such as a customer device 40 and/or a TCA server 20. The issuer terminal 10 may also include at least one processor circuit 1603 (also referred to as a processor) coupled to the network interface 1607, and at least one memory circuit 1605 (also referred to as memory) coupled to the processor 1603. The memory 1605 may include computer readable program code that when executed by the processor 1603 causes the processor 1603 to perform operations according to embodiments disclosed herein for an issuer terminal 10. According to other embodiments, processor 1603 may be defined to include memory so that a separate memory circuit is not required.

As discussed herein, operations of the issuer terminal 10 may be performed by processor 1603 and/or network interface 1607. For example, processor 1603 may control network interface 1607 to send communications through network interface 1607 to one or more other network nodes and/or other system nodes, and/or to receive communications through network interface 1607 from one or more other network nodes and/or other system nodes. Alternatively, or additionally, the network node 1600 may include modules, e.g., circuitry, that performs respective operations (e.g., operations discussed herein with respect to example embodiments of network nodes).

Figure 9:
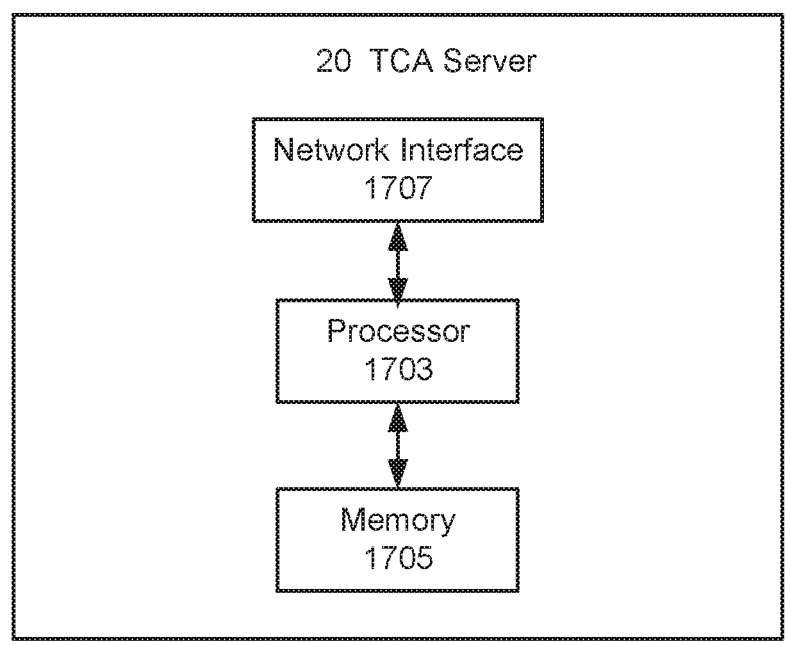
FIG. 9 is a block diagram illustrating some elements of a server in a digital lottery ticket system in accordance with some embodiments.

FIG. 9 is a block diagram illustrating elements of a TCA server 20 according to one or more embodiments disclosed herein. As shown, the TCA server 20 may include at least one network interface circuit 1707 (also referred to as a network interface) configured to provide communications with other nodes, such as a customer device 40 and/or an issuer terminal 10. The TCA server 20 may also include at least one processor circuit 1703 (also referred to as a processor) coupled to the network interface 1707, and at least one memory circuit 1705 (also referred to as memory) coupled to the processor 1703. The memory 1705 may include computer readable program code that when executed by the processor 1703 causes the processor 1703 to perform operations according to embodiments disclosed herein for an issuer terminal 10. According to other embodiments, processor 1703 may be defined to include memory so that a separate memory circuit is not required.

As discussed herein, operations of the TCA server 20 may be performed by processor 1703 and/or network interface 1707. For example, processor 1703 may control network interface 1707 to send communications through network interface 1707 to one or more other network nodes and/or other system nodes, and/or to receive communications through network interface 1707 from one or more other network nodes and/or other system nodes. Alternatively, or additionally, the network node 1700 may include modules, e.g., circuitry, that performs respective operations (e.g., operations discussed herein with respect to example embodiments of network nodes).

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, electronic gaming terminals, processors, memory, networks, for example. With reference to FIGS. 7, 8 and 9, illustrative systems for implementing the described techniques include a general purpose computing device in the form of a computer, such as a mobile computing device in the case of the user device 40 or a fixed computing device in the case of the issuer terminal 10 and/or the TCA server 20. Components of the computer may include, but are not limited to, a processing unit including a processor circuit, such as a programmable microprocessor or microcontroller, a system memory, and a system bus that couples various system components including the system memory to the processing unit.

The processor circuit may be a multi-core processor including two or more independent processing units. Each of the cores in the processor circuit may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data.

The computer may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computer may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computer may be connected to the LAN through a network interface or adapter. When used in a WAN networking environment, the computer may include a modem or other means for establishing communications over the WAN. The modem, which may be internal or external, may be connected to the system bus via the user input interface, or other appropriate mechanism.

Some embodiments of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processing circuitry of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in any conventional procedural programming language, including interpreted languages, assembled languages and/or compiled languages. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the inventive concepts being set forth in the following claims.

What is claimed is:

1. A method of generating a digital lottery ticket, the method comprising:
   receiving a transaction record associated with a ticket issuance request from a computing device, wherein the transaction record comprises transaction data including a player entry and a first public key associated with the player entry;
   generating a first message including digital ticket information relating to the player entry, a source field and a destination field, wherein the digital ticket information includes the first public key which identifies a player associated with the player entry;
   generating a hash of the first message;
   generating a digital signature of the hash of the first message using a private key of an issuer server;
   transmitting the first message and the digital signature to a transaction certification authority ("TCA") server, for storage on a publicly viewable transaction ledger maintained by the TCA;
   receiving from the TCA server a second message including a digital ticket number and a transaction ID associated with the first message and the digital ticket number; and
   transmitting a third message including the transaction ID and the digital ticket number to the computing device.

2. The method of claim 1, further comprising:
   retrieving a record from the publicly viewable transaction ledger associated with the transaction ID; and
   determining whether the record represents a valid transaction;
   wherein transmitting the third message comprises transmitting the third message in response to determining that the record represents a valid transaction.

3. The method of claim 1, wherein the digital signature comprises a first digital signature, and wherein the first message is stored on the publicly viewable transaction ledger as a transaction record comprising the first message, the first digital signature of the first message, and a second digital signature of a fourth message including the first message and the first digital signature of the first message, wherein the second digital signature is generated using a private key of the TCA.

4. The method of claim 1, wherein the source field comprises a first public key of the ticket issuer; and
   wherein the destination field comprises a second public key associated with the computing device.

5. The method of claim 1, wherein the TCA has permissioned access to the publicly viewable transaction ledger.

6. The method of claim 1, wherein the publicly viewable transaction ledger has public read access rights.

7. A system for generating digital lottery tickets, the system comprising:
   a memory device; and
   a processing device operatively coupled to the memory device, wherein the processing device is configured to execute computer-readable program code to:
      receive a transaction record associated with a ticket issuance request from a computing device, wherein the transaction record comprises transaction data including a player entry and a first public key associated with the player entry;
      generate a first message including digital ticket information relating to the player entry, a source field and a destination field, wherein the digital ticket information includes the first public key which identifies a player associated with the player entry;
      generate a hash of the first message;
      generate a digital signature of the hash of the first message using a private key of an issuer server;

transmit the first message and the digital signature to a transaction certification authority ("TCA") server, for storage on a publicly viewable transaction ledger maintained by the TCA;

receive from the TCA server a second message including a digital ticket number and a transaction ID associated with the first message and the digital ticket number; and transmit a third message including the transaction ID and the digital ticket number to the computing device.

8. A system operatively connected with a block chain network and for using the block chain network for generation and validation of digital lottery tickets, the system comprising:

a ticket issuer server comprising a first memory device and a first processing device operatively coupled to the first memory device; and a transaction certification server comprising a second memory device and a second processing device operatively coupled to the second memory device;

wherein the ticket issuer server is configured to execute computer-readable program code to:

receive a transaction record associated with a ticket issuance request from a computing device, wherein the transaction record comprises transaction data including a player entry and a first public key associated with the player entry;

generate a first message including digital ticket information relating to the player entry, a source field and a destination field, wherein the digital ticket information includes the first public key which identifies a player associated with the player entry;

generate a hash of the first message;

generate a digital signature of the hash of the first message using a private key of an issuer server;

transmit the first message and the digital signature to a transaction certification authority ("TCA") server, for storage on a publicly viewable transaction ledger maintained by the TCA;

receive from the TCA server a second message including a digital ticket number and a transaction ID associated with the first message and the digital ticket number; and transmit a third message including the transaction ID and the digital ticket number to the computing device;

wherein the TCA server is configured to:

receive the first message and the first digital signature;

generate a second digital signature of the first message and the first digital signature using a private key of the transaction certification server;

store the first message, the first digital signature and the second digital signature in a publicly viewable transaction ledger; and transmit the second message including the transaction ID and the digital ticket number to the ticket issuer server.

9. A method of transferring a digital lottery ticket from a first computing device to a second computing device, the method comprising:

receiving a second public key of the second computing device;

retrieving a digital ticket information associated with the digital lottery ticket;

generating a first message including the digital ticket information, a source field including a first public key of the first computing device and a destination field including the second public key of the second computing device;

generating a hash of the first message;

generating a digital signature of the hash of the first message using a private key of the first computing device;

transmitting the first message and the digital signature to a transaction certification authority ("TCA") server, for storage on a publicly viewable transaction ledger maintained by the TCA;

receiving from the TCA server a second message including a digital ticket number and a transaction ID associated with the first message and the digital ticket number; and transmitting a third message including the transaction ID and the digital ticket number to the second computing device.

10. The method of claim 9, further comprising:

retrieving a record from the publicly viewable transaction ledger associated with the transaction ID; and determining whether the record represents a valid transaction;

wherein transmitting the third message comprises transmitting the third message in response to determining that the record represents a valid transaction.

11. The method of claim 9, wherein the digital signature comprises a first digital signature, and wherein the first message is stored on the publicly viewable transaction ledger as a transaction record comprising the first message, the first digital signature of the first message, and a second digital signature of a fourth message including the first message and the first digital signature of the first message, wherein the second digital signature is generated using a private key of the TCA.

12. The method of claim 9, wherein the TCA has permissioned access to the publicly viewable transaction ledger.

13. The method of claim 9, wherein the publicly viewable transaction ledger has public read access rights.

14. A method of operating a transaction certifying authority server for managing digital lottery ticket records, comprising:

receiving a message from a lottery ticket issuer server, the message comprising digital ticket information regarding a digital lottery ticket that is being issued by the lottery ticket issuer server, a source field identifying a source of the digital lottery ticket and a destination field identifying a destination of the digital lottery ticket, and a first digital signature of the lottery ticket issuer server;

verifying the first digital signature of the lottery ticket issuer server;

generating a second digital signature of a hash of the message and the first digital signature using a private key of the transaction certification authority server;

storing the message, the first digital signature and the second digital signature in a publicly viewable transaction ledger; and transmitting a second message including the transaction ID and the digital ticket number to the lottery ticket issuer server.

15. The method of claim 14, wherein the second message includes the digital ticket information.

16. The method of claim 14, wherein storing the message, the first digital signature and the second digital signature in a publicly viewable transaction ledger comprises generating a transaction record and storing the transaction record in the publicly viewable transaction ledger.

17. The method of claim 16, wherein storing the transaction record in the publicly viewable transaction ledger comprises:
- retrieving a hash value of a previous block in the publicly viewable transaction ledger;
- assembling a plurality of transaction records and the hash value of the previous block into a new block;
- generating a hash of the new block; and
- storing the new block in the publicly viewable transaction ledger.

18. The method of claim 14, wherein the publicly viewable transaction ledger comprises a permissioned ledger.

\* \* \* \* \*